United States Patent

Bettman

[11] Patent Number: 5,946,338
[45] Date of Patent: Aug. 31, 1999

[54] DECOUPLED INTRACAVITY LASER ALIGNMENT

[75] Inventor: Ralph Bradford Bettman, Mountain View, Calif.

[73] Assignee: Uniphase Corporation, San Jose, Calif.

[21] Appl. No.: 09/126,008

[22] Filed: Jul. 29, 1998

[51] Int. Cl.$^6$ ...................................................... H01S 3/00
[52] U.S. Cl. ............................. 372/107; 372/22; 372/105
[58] Field of Search .............................. 372/107, 22, 105, 372/82, 98

[56] References Cited

U.S. PATENT DOCUMENTS

| | | | |
|---|---|---|---|
| 5,091,913 | 2/1992 | Zhang et al. | 372/105 |
| 5,136,597 | 8/1992 | Nightingale | 372/21 |
| 5,383,209 | 1/1995 | Hwang | 372/22 |
| 5,497,388 | 3/1996 | Goto et al. | 372/22 |
| 5,768,304 | 6/1998 | Goto | 372/22 |
| 5,809,048 | 9/1998 | Shichijyo et al. | 372/22 |

*Primary Examiner*—Leon Scott, Jr.
*Attorney, Agent, or Firm*—Stephen C. Shear; Mike Pritzkau

[57] ABSTRACT

There is disclosed a method of performing alignment adjustments for bringing a laser into a desired alignment which, in turn, affects light output intensity of the laser. The laser defines an alignable light path within a resonant cavity and includes a birefringent nonlinear material having an input face. The method includes the steps of arranging the nonlinear material in the light path in a way which causes the light path to pass through the input face of the nonlinear material such that the alignment adjustments affect a plurality of parameters which parameters are normally interdependently coupled to one another with respect to each alignment adjustment. One of the parameters being the phase retardance of the birefringent nonlinear material and one of the adjustments is the tilt of the birefringent nonlinear material with respect to the light path. The tilt adjustment is substantially decoupled from the phase retardance parameter by fabricating the birefringent nonlinear material so that a particular parameter of the birefringent material is substantially optimized for any angle within an optimized range of angles surrounding a specific angle measured from a line normal to the input face of the birefringent nonlinear material and, thereafter, setting the orientation of the birefringent nonlinear material such that the line normal to the input face resides in a particular range of angles which is centered on the specific angle. The tilt angle is adjusted within the particular range of angles so as to adjust parameters other than the phase retardance in a way which at least partially brings the laser into the desired alignment. The phase retardance is then adjusted using an adjustment other than the tilt adjustment to bring the laser into the desired alignment.

13 Claims, 2 Drawing Sheets

DECOUPLED INTRACAVITY LASER ALIGNMENT

BACKGROUND OF THE INVENTION

The present invention relates generally to intracavity lasers incorporating a birefringent nonlinear element and more particularly to an alignment technique for such a laser which decouples one alignment adjustment from one or more other alignment adjustments in a way which significantly reduces the complexity of the overall alignment procedure, thereby reducing manufacturing costs.

The construction of any laser must include a step in which the laser is aligned in such a way that one or more selected wavelengths of light experience gain during retrace between the mirrors which serve to define the resonant cavity of the laser. When other elements are also included in the cavity, as an example, a nonlinear birefiingent element used for purposes of providing second-harmonic generation, other conditions must also be satisfied. A birefringent nonlinear element, when used for second harmonic generation, is properly positioned in the light path when, in addition to considerations of the optimum polarization vector orientation of the fundamental lasing radiation with respect to the crystal axes, the light path taken by the fundamental(s) through the birefringent nonlinear element cooperates with the overall light path to provide for retracing of the fundamental(s), the phase retardance properties of the birefringent nonlinear element (acting in concert with any polarization sensitive elements) impart minimal/acceptable losses to the lasing fundamental(s) and the phase matching properties of the nonlinear element between the fundamental (s) and one or more desired harmonics are at a peak (i.e., conversion of light from the fundamental(s) to the desired harmonic wavelength(s) is maximized in order to provide an acceptable output power at the harmonic wavelength(s)). Many applications for lasers which emit light at a harmonic of a fundamental lasing frequency, e.g. frequency-doubled lasers, require that the output be highly stable across a large frequency bandwidth. Frequency-doubled lasers which exhibit periodic fluctuation of intensity of greater than 0.5% at any frequency up to 10 or 20 Mhz are commonly referred to as being 'noisy' and unsuitable for many applications. These fluctuations are an undesirable side effect of the coupling of various fundamental lasing modes operating within the cavity. The only prior art solutions to this problem are to force the laser to operate in only a single mode, or to operate in such a large number of modes that the fluctuations cancel one another out on a statistical basis.

In a majority of prior art lasers utilizing a birefringent nonlinear element, the latter element was arranged in the light path such that its parallel input/output surfaces were normal to the light path. This arrangement was thought to be advantageous since lasers such as frequency doubled intracavity lasers are extremely intolerant of losses due, for example, to reflections. Angling the nonlinear element with respect to the light path would result in reflecting at least a portion of the fundamental wavelength out of the light path, constituting an unacceptable loss at the fundamental wavelength which, of course, translates into a loss at the harmonic wavelength. At the same time, however, it should be appreciated that certain problems were introduced by placing the birefringent element in normal incidence to the beam. For example, the retardance properties of the material could not be controlled accurately by precise manufacturing and could only be affected by temperature. The amount of control available through temperature adjustment was dependent upon the length of the birefringent element. Moreover, the parallel surfaces of the element, in an orientation which is normal to the light path, may cause intra-cavity etalon or sub-cavity effects resulting in undesirable noise imposed upon the output wavelength(s).

More recently, anti-reflective coatings have been provided on the light input/output surfaces of the nonlinear element which lower reflections from the input/output surfaces to an acceptable level even in an angular orientation with respect to the light path. Thus, lasers can now be built with components placed at an angle to the beam path to avoid the problems caused by normal interfaces. In addition, an extra means of adjustment, tilt angle, is now available to optimize alignment. Unfortunately, achieving a satisfactory alignment using the tilt angle and temperature adjustments can be an extraordinarily difficult task since the laser behaves in a seemingly unpredictable manner as the adjustments are performed. That is, for example, as the tilt angle or temperature is adjusted very slightly with the laser operating at a single wavelength and output intensity, the output may jump wildly to another wavelength or combination of other wavelengths with an output intensity that is much different than the pre-adjustment intensity. In instances where the post-adjustment output power is greater than the pre-adjustment power, one must again check for low noise and good spatial mode quality in the laser's output; instances in which the new output is lower in power are not of great commercial interest. This unpredictable behavior contributes significantly to manufacturing costs by imposing an alignment procedure which typically requires significant skill and a substantial, but unavoidable period of time to perform for reasons which will be made evident at an appropriate point hereinafter.

The present invention provides a highly predictable alignment technique which utilizes the tilt adjustment in combination with other adjustments in a heretofore unknown and highly advantageous way. Due to the predictable behavior of the laser during the use of this technique, manufacturing costs are thereby directly reduced.

SUMMARY OF THE INVENTION

As will be described in more detail hereinafter, there is disclosed herein a method of performing alignment adjustments for bringing a laser into a desired alignment which, in turn, affects light output intensity of the laser. The laser defines an alignable light path within a resonant cavity and includes a birefringent nonlinear material having an input face. The method includes the steps of arranging the nonlinear material in the light path in a way which causes the light path to pass through the input face of the nonlinear material such that the alignment adjustments affect a plurality of parameters which parameters are normally interdependently coupled to one another with respect to each alignment adjustment. One of the parameters being the phase retardance of the birefringent nonlinear material and one of the adjustments being tilt angle of the birefringent non-linear material with respect to the light path. The tilt angle adjustment is substantially decoupled from the phase retardance parameter by fabricating the birefringent nonlinear material so that a particular parameter of the birefringent material is substantially optimized for any angle within an optimized range of angles surrounding a specific angle measured from a line normal to the input face of the birefringent nonlinear material and, thereafter, setting the orientation of the birefringent nonlinear material such that the line normal to the input face resides in a particular range of angles which is centered on the specific angle. The tilt angle is then adjusted so as to adjust parameters other than the phase retardance in a way which at least partially brings the laser into the desired alignment. The phase retardance is adjusted using an adjustment other than the tilt adjustment to bring the laser into the desired alignment.

In one aspect of the invention, the adjustment of the tilt angle to bring the laser into the partial desired alignment is performed by rotation of the X-Y plane of the birefringent nonlinear material about its Z axis.

In another aspect of the invention, the adjustment of the tilt angle to bring the laser into the partial desired alignment is performed by tilting the Z axis directly toward/away from said light path along either direction of the light path.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
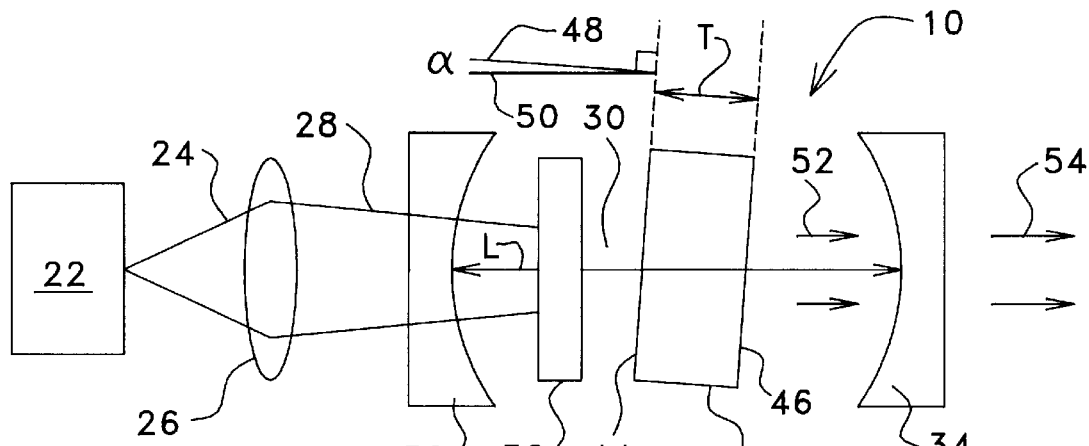
FIG. 1 is a diagrammatic view of an intracavity doubled laser manufactured in accordance with the present invention in which a birefringent nonlinear material is arranged at an angular orientation with respect to the light path of the laser for use in a decoupled alignment procedure of the present invention.

Attention is immediately directed to FIG. 1, which diagrammatically illustrates one embodiment of an intracavity doubled laser manufactured in accordance with the present invention and generally indicated by the reference numeral 10. Laser 10 includes a pumping light source 22 which emits a pump beam 24 at a predetermined frequency. Pump beam 24 is directed into a lens 26 and emerges therefrom to form a beam 28. Beam 28 then passes into a resonant cavity 30 through an input mirror 32 which is designed to be highly transmissive at the predetermined frequency of the pumping source while being highly reflective to one or more fundamental lasing wavelengths. An opposing end of the resonant cavity is defined by an output mirror 34. Resonant cavity 30 defines a lasant light path L between the input and output mirrors. It is mentioned that light path L is depicted as being straight for purposes of clarity, however, the light path is not typically straight as a result of the various optical elements disposed along its length.

Continuing to refer to FIG. 1, output mirror 34 is designed to be highly reflective to the fundamental lasing wavelength while being highly transmissive to a frequency at or near double the frequency of the fundamental wavelength. After passing through the input mirror, light beam 28 is incident upon a laser gain medium 36. Pumping light source 22 may be provided in a variety of different forms so long as it produces or emits pump beam 24 at the predetermined frequency which is matched to the laser transitions of the material used as the laser gain medium, as is well known. In one embodiment, a laser diode which emits light at a wavelength at or about 808 nm is used as pumping light source 22. As is well known in the art, laser diodes of this type are readily available. When directed into laser gain medium 36, pump beam 24 excites atomic laser transitions within the laser gain medium which cause the material to produce a range of frequencies/wavelengths in resonant cavity 30 including one or more desired fundamental frequencies as well as other, unwanted frequencies. The fundamental and output frequencies of laser 10 can vary depending upon the specific materials used as the laser gain medium.

A birefringent nonlinear material 42 such as, for example, KTP in a Type II configuration is also positioned along light path L. Material 42 includes parallel light input/output surfaces 44 and 46. The nonlinear material is fabricated from a substrate defining the aforementioned plane and parallel input/output surfaces and with crystalline axes inclined such that a phase-matched condition exists when the material is tilted at a specific angle. It is important to note that the present invention is suitable for use with other birefringent nonlinear materials in Type I or Type II arrangements such as, for example, BBO and LBO in accordance with the teachings herein.

As seen in FIG. 1, in accordance with the present invention, a line 48 which is perpendicular to the light input/output surfaces forms an angle a with a line 50 representing the orientation of light path L. During operation of the laser, light produced by lasant material 36 retraces along light path L. Fundamental wavelengths which retrace and which experience gain will lase along the light path. Upon passing through non-linear birefiingent material 42, the fundamental lasing wavelength(s) generated initially by material 36 produce second harmonic wavelengths 52 which pass through output mirror 34 becoming output light 54. As previously described with reference to the prior art, the input/output surfaces of nonlinear material 42 were typically oriented perpendicular to light path L (i.e., $\alpha=0$) in a way which provided for a relatively uncomplicated alignment of the laser. At the same time, however, the present invention recognizes that such an alignment generally provided for an output at an uncontrolled wavelength or wavelengths. This condition is considered as being unacceptable in accordance with the teachings of the present invention since the laser's output will likely either be low in power even if single wavelength operation is achieved or 'noisy' in the instance of multiple wavelength operation. In fact, it is submitted that it may not be possible to achieve an alignment which results in appreciable output of desired harmonic light 54 in the prior art "normal" orientation for a particular sample of nonlinear material due to the specific characteristics of the nonlinear material in conjunction with the fact that the phase retardance, path length and phasematching properties are not independently alignable in such a configuration. Moreover, even if an optimal alignment does exist, the process of finding it can be problematic because the interrelationships of the various adjustments with the various optical behaviors makes interpretation of the observed performance quite difficult. Such an alignment procedure can take a very long time.

The present invention recognizes that, with the non-linear material in a tilted orientation, a rather large number of combinations of $\alpha$ with other adjustments such as, for example, different temperatures may provide an acceptable light output at or near the desired harmonic frequency. However, in view of the preceding discussion with regard to orientation of the beam normal to the input/output surfaces of the nonlinear material, finding these combinations is actually complicated still further by the addition of the tilt variable. Even when a workable combination is discovered, unfortunately, it may be a combination in which fine adjustment of the laser's output is extremely difficult to achieve due to the laser exhibiting seemingly erratic behavior. Unless care is taken to fabricate the birefringent element such that it can be used to operate within the range of angles previously described, a small change in angular position will effect significant changes in the modes selected to operate within the laser cavity. As will be seen immediately hereinafter, the present invention provides a highly advantageous alignment technique which permits the laser to be aligned with a high degree of predictability and which avoids the need for a time consuming search for a workable combination of alignment adjustments.

Describing the technique of the present invention in a general way, the alignment task is simplified by desensitizing one of the properties or parameters of the nonlinear element to one alignment adjustment. In particular, the retardance properties of non-linear birefringent element 42 are made minimally sensitive to its mechanical tilt, $\alpha$, in a way which will be described at an appropriate point below. Therefore, another adjustment such as, for example, temperature, may be used to achieve the desired retardance value for the nonlinear element, and mechanical tilt may be used to achieve optimization of one of the other properties such as, for example, phase-matching, with minimal impact on the retardance adjustment. It should be noted that the precise optical path length property of the nonlinear element is not addressed by this invention for two reasons: (1) the precise cavity length requirement for a laser can be satisfied with adjustments to other parts of the laser structure (for example, output mirror 34) and (2) the adjustments required to effect changes to the optical path length are typically very small. Therefore, minor detuning of the temperature and/or tilt can be performed to satisfy this condition without significantly affecting the performance of the laser device. In accordance with the present invention, alignment adjustments may be limited to performing one adjustment to optimize phase matching (assuring optimum light conversion efficiency from the fundamental to the harmonic wavelengths) and another adjustment to optimize phase retardance/waveplating performance (selecting the particular fundamental wavelength which lases).

Figure 2:
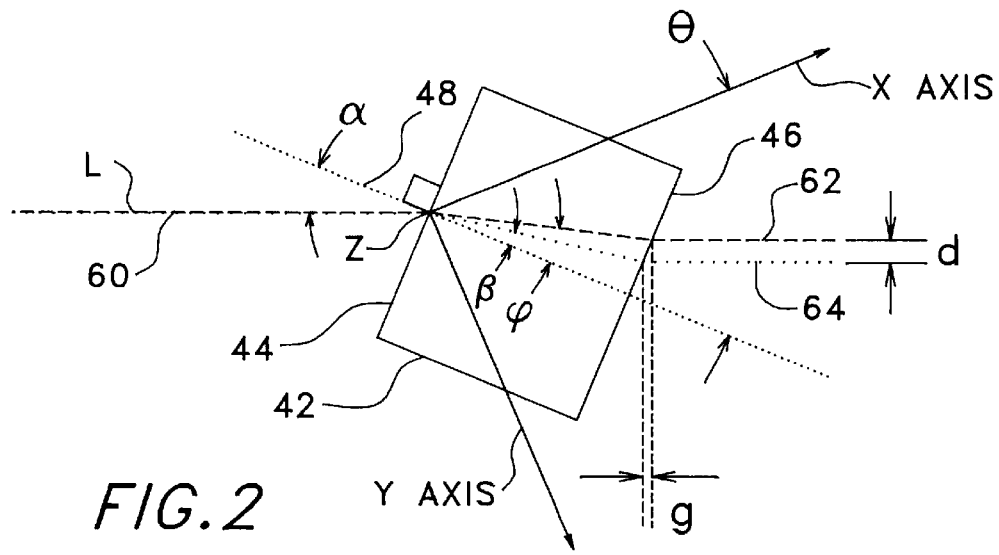
FIG. 2 is a diagrammatic view of the arrangement of the birefringent nonlinear material of FIG. 1 shown here to illustrate further details of its arrangement and aspects of its operation.

Turning to FIG. 2, having provided a basic conceptual understanding of the present invention, a description of its implementation will now be provided. Non-linear element 42 is shown in an exemplary angular orientation $\alpha$ with respect to light path L. Once again, tilt angle is measured, in this instance, as $\alpha$. The nonlinear material includes an X-Y plane which lies in the plane of the figure and a Z axis which is perpendicular to the plane of the figure. It is noted that the angles illustrated in the present figure have been exaggerated for purposes of clarity. For illustrative purposes, a beam 60 of light is shown as being incident upon light input/output surface 44 along light path L. Beam 60 includes an X-Y polarization component 62 (indicated by short, generally vertical lines) which lies in the X-Y plane and a Z polarization component 64 (indicated by dots) which, of course, is polarized along the Z axis. Optical phase retardance occurs when two components such as X-Y component 62 and Z component 64 of a traveling electromagnetic wave travel at different velocities through a birefringent material. The X-Y component is subjected to an $N_{xy}$ index of refraction while the Z component is subjected to an $N_z$ component of refraction. These components will leave the nonlinear material having a relative phase shift between their E-fields which is generally different from the phase relationship the components had as they entered the media. Of course, at normal incidence ($\alpha=0$), both components pass through the nonlinear birefringent element without being refracted. However, with a non-zero $\alpha$, these components are refracted, and because each component encounters a different index of refraction, each is refracted differently. Therefore, the path length which each component takes through the material is affected by the way in which it is refracted. As the path length through the birefringent media changes (by varying $\alpha$), so too does the relative phase shift imparted between the two components. Because the two components of the beam encounter different indices of refraction in the material and because the beam strikes the surface of the media at an angle, a slight displacement d occurs between the two components as they emerge from light input/output surface 46. Due to the fact that $N_z$ is greater than $N_{xy}$, the Z component is always refracted more strongly than the X-Y component, and upon exiting the nonlinear element the Z component must always travel an extra distance "g" to come to a position on a wavefront which is vertically aligned (in the figure) with the position at which the wavefront for the X-Y component exits. It is noted that FIG. 2 provides a somewhat more accurate illustration of light path L since it is not shown as being straight.

Still referring to FIG. 2, one of ordinary skill in the art might assume that irrespective of which direction the nonlinear element is tilted, the phase shift between the X-Y and Z components would change from its normal incidence value in a gradual, predictable manner. If this were the case, one would also expect that the change in the retardance value of the nonlinear material versus tilt angle would exhibit a null for the case of a normally incident beam. Accordingly, the phase shift between the components would gradually change for tilts away from normal incidence, and these changes would be symmetric about the normal incidence case. That is not, however, what is observed for tilts of KTP about its Z-axis. In this regard, it should be noted that the index of refraction for the X-Y component varies with $\alpha$. This variation, although very small, is enough to displace the angle at which a null in the phase shift behavior occurs significantly away from normal incidence in one direction of rotation (clockwise as shown in the figure). The specific location of the null point will be described at an appropriate point below. For the moment, however, it is important to note that changes in retardance behavior are symmetrical and at a minimum over a certain range with respect to the null point when the KTP is rotated about the Z axis and oriented perpendicular to light path L. It is also important to note that the Z axis itself may be tilted by approximately the same range with a minimal influence on phase retardance from the value produced at the null point. Specifically, by tilting the Z axis along the direction of light path L, a symmetrical, but minimal variation in retardance is observed with respect to the aforementioned null point. Thus, the teaching of the present invention resides in the recognition that the null point defines the center of a region or range over which the change in retardance is minimal, irrespective of the manner in which a shift away from the actual null point is achieved. It should be noted that all birefringent materials exhibit the aforedescribed null in retardance at some angle. However, the null occurs at different specific angles from one material to the next. The complete expression describing the retardance imparted between the components for tilts within a plane containing birefringent axes (here labeled X and Y) is:

$$R = T*N_z/\cos \beta(\phi,\theta) - T*N_{xy}(\phi,\theta)/\cos \phi + T*\sin \alpha(\phi,\theta)*(\tan \phi - \tan \beta(\phi,\theta)) \quad (1)$$

where T is the length or thickness of birefringent nonlinear element 42, $\alpha$ is the tilt angle as measured externally in air, $\beta$ is the refracted angle for the Z-axis component, $\phi$ is the internal, refracted angle for the X-Y component, $N_z$ is the index of refraction for the Z component, and $N_{xy}$ is the index of refraction for the X-Y component. $\theta$ is the angular orientation of the X axis of material 42 with respect to normal line 48 and is commonly referred to as the crystal cut angle. Typically, material 42 is cut such that $\theta$ provides relatively optimal phase matching at a specific angle somewhere near the anticipated angular orientation at which the birefringent nonlinear material will operate. In the present example, for KTP, a $\theta$ of approximately 28.6° has been found to be useful. Moreover, acceptable phase matching is achieved within an optimized range of angles of approximately 3° in any direction from the specific angle. As noted previously, angles represented in FIGS. 1 and 2 are not to scale for illustrative purposes. In equation 1, $N_{xy}$, $\alpha$, and $\beta$ are functions of the propagation angle which itself is a function of crystal cut angle $\theta$ and the tilt angle $\phi$ in accordance with Equations 2, 3 and 4, as set forth immediately hereinafter.

$$N_{xy}(\phi,\theta) = N_x * N_y / (N_x^2 * \cos(\theta - \phi)^2 + N_y^2 * \sin(\theta - \phi)^2)^{1/2} \quad (2)$$

$$\sin \alpha(\phi,\theta) = \sin \phi * N_{xy}(\phi,\theta) \quad (3)$$

$$\sin \beta(\phi,\theta) = \sin \phi * N_{xy}(\phi,\theta) / N_z \quad (4)$$

Figure 3:
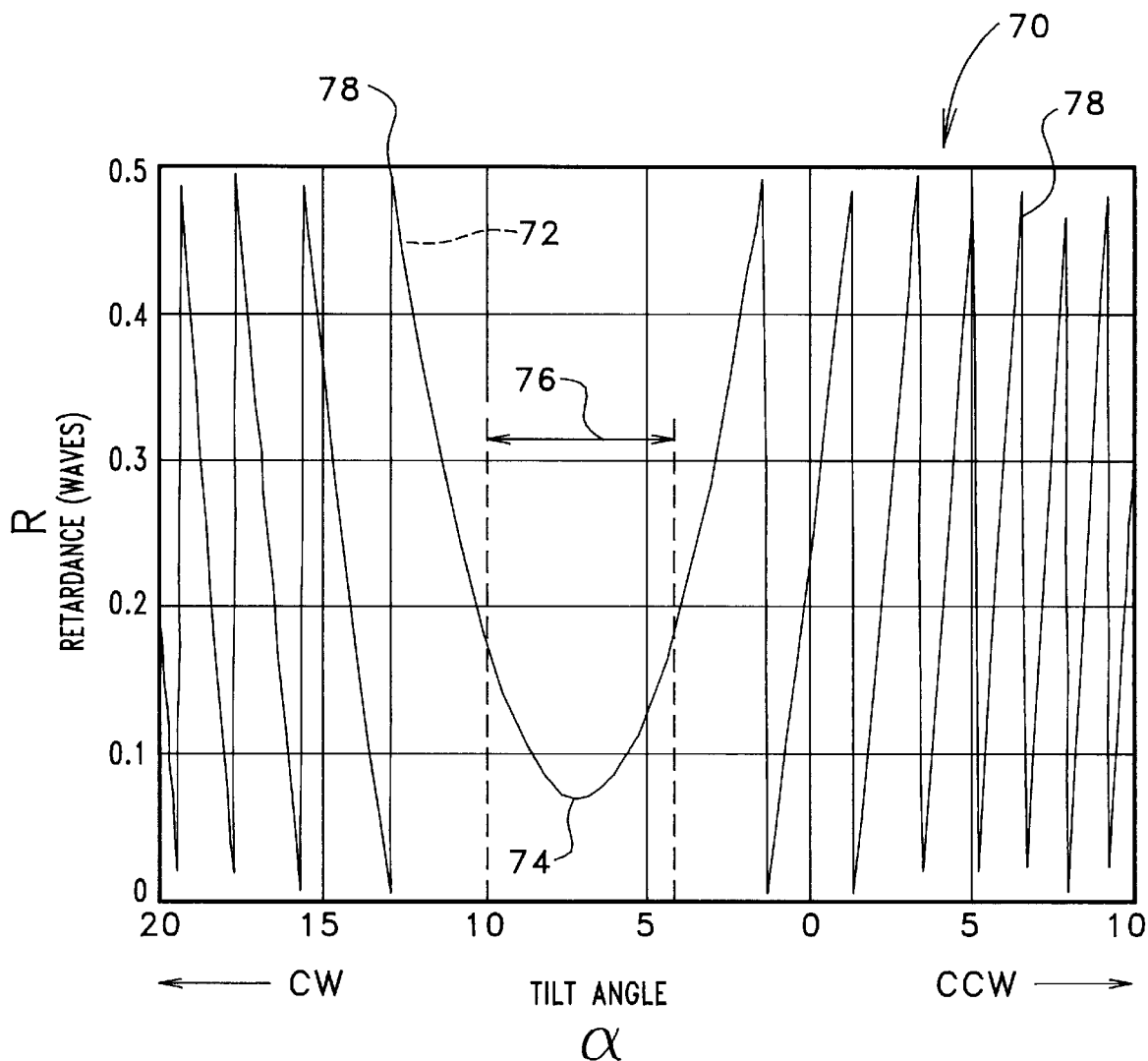
FIG. 3 is a plot of phase retardance of the birefiingent nonlinear material used in the laser of FIG. 1 versus the tilt angle of the material with respect to the light path of the laser relative to the nearest half-wave of retardation, shown here to illustrate a highly advantageous decoupled tilt angle range in the retardance/waveplating performance.

Turning to FIG. 3 in conjunction with FIGS. 1 and 2, a retardance plot 70 is illustrated which is generated using equations 1–5. It is noted that this plot considers a constant temperature. In plot 70, retardance R from equation 1 is plotted along a vertical axis indicated in fractions of one half wave of retardation for the fundamental wavelength (1.064 microns) while tilt angle measured in the form of $\alpha$ is plotted along a horizontal axis indicated in degrees. A retardance curve is indicated by the reference numeral 72. It is noted that by taking the derivative of equation 1 and setting it to be equal to zero, $\alpha$ corresponding to a null 74 in the retardance curve is identified as being located at approximately 7.13° in a clockwise direction. More significantly, as mentioned in slightly different terms above, the present invention recognizes that a range of tilt angles exists in multiple directions or dimensions surrounding null 74 over which retardance R is substantially decoupled from tilt angle measured and adjustable as $\alpha$ or, alternatively, measured and adjustable as tilt of the Z axis with respect to light path L. That is, the slope of curve 72 is reduced compared with the remainder of curve 72. While the decoupled tilt range is not specifically illustrated with respect to tilting of the Z axis itself, it has been discovered to be of approximately the same width as the decoupled range presented by tilt about the Z axis or approximately 3° to either side of perpendicular orientation of the Z axis toward/away from either direction along light path L with the X-Y plane remaining in a "vertical" orientation in FIGS. 1 and 2. That is, for 0° Z axis tilt, the X-Y plane remains in the plane of FIGS. 1 and 2. However, it is also anticipated that the decoupled sensitivity of retardance is best utilized when the birefringent nonlinear crystal is fabricated and oriented in the X-Y plane as described herein. Hereinafter, this range of angles will be referred to as a decoupled tilt range for rotation about the Z axis (measured as $\alpha$) and is indicated by the reference number 76 for $\alpha$ or, alternatively, for tilt of the Z axis with respect to light path L. For $\alpha$, the decoupled tilt range extends from approximately 4° to 10°. Portions of curve 72 outside of decoupled tilt range 76 exhibit generally very steep slopes which result in a extremely high coupling between $\alpha$ and R. For example, a series 78 of very steep sawtooth steps in the plot are positioned at either side of null 74 such that a very small change in $\alpha$ can produce a large change in R. For tilt of the Z axis with respect to light path L, the decoupled tilt range is approximately 3 degrees to either side of perpendicular orientation of the Z axis with respect to light path L. For purposes of clarity, a majority of the remaining discussions considering the adjustment of $\alpha$ will not additionally mention tilt of the Z axis with respect to light path L. However, it is to be understood that adjustment of Z axis tilt is considered as a viable alternative in any instance wherein a is adjusted within its decoupled tilt range.

As previously described, the present invention contemplates an alignment procedure in which essentially all parameters may be accounted for through phase matching and retardance. Further, the present invention recognizes that the use of a decoupled tilt range using $\alpha$ or Z axis tilt is highly advantageous in the process of laser alignment. Specifically, by initially setting a within the decoupled tilt range, the retardance parameter is substantially decoupled from $\alpha$. Therefore, so long as $\alpha$ is within the decoupled $\alpha$ range, tilt angle $\alpha$ may be utilized to adjust phase matching without substantially affecting retardance in an overall simplified alignment procedure. Conversely, if $\alpha$ is outside of the decoupled $\alpha$ range, retardance is generally dramatically altered with even minor changes in $\alpha$. In this latter regard, it should also be mentioned that the aforedescribed alignment problems which were encountered in the prior art are now understood. Specifically, an alignment procedure is an extremely difficult proposition outside of the decoupled tilt range since a change in $\alpha$ generally produces large changes in both phase matching and retardance parameters while, at the same time, a change in temperature likewise generally produces large changes in both phase matching and retardance. Thus, the prior art "closely coupled" alignment procedure often became little more than a frustrating guessing game, since each alignment adjustment influenced every parameter.

Figure 4:
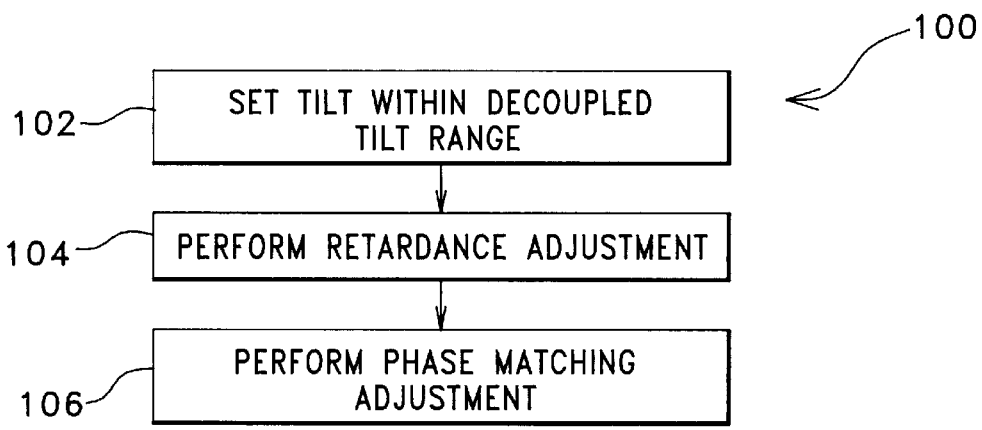
FIG. 4 is a flow diagram illustrating the highly advantageous decoupled alignment procedure of the present invention utilizing the decoupled tilt angle range.

Referring to FIG. 4, the decoupled alignment procedure of the present invention is generally indicated by the reference numeral 100. Procedure 100 includes step 102 of initially setting the tilt angle [$\alpha$ or Z axis tilt] of birefringent nonlinear material 42 within the decoupled tilt range. It should be appreciated that the initial tilt setting may be anywhere within the decoupled tilt range since retardance is substantially decoupled from tilt throughout the range. Step 104 is then performed by adjusting the retardance using an adjustment other than tilt. Typically, temperature has been found to be a useful adjustment in this regard. However, adjustments other than temperature may be utilized. These adjustments include, but are not limited to electrostatic field intensities and other mechanical or positioning arrangements. Following step 104, step 106 is next performed in which phase matching is adjusted whereby to optimize conversion of one or more fundamental wavelengths to appropriate harmonics. Having completed the initial step 106 it should be noted that the present invention contemplates repeating steps 104 and 106 in an alternate fashion for purposes of fine tuning. Such fine tuning is readily accomplished with α varying within the decoupled tilt range.

With regard to the prior art, it should be noted that previous methods for building frequency doubled lasers did not address decoupled alignment adjustments. Instead, manufacturing alignment procedures required personnel with extensive amounts of experience and judgment due to then inexplicable subtleties of laser behavior. Even then, alignment procedures were difficult, time consuming tasks. It should also be noted that U.S. Pat. No. 5,136,597, issued to Nightingale, discloses a nonlinear material in an angular orientation (specifically limited to 7.34°±1°) with respect to the laser's light path. However, the patent is addressed to the narrow problem of Poynting vector walk-off by rotation of the X-Y plane about the Z axis. Angular orientation of the nonlinear material is utilized solely for purposes of canceling the effects of Poynting vector walk-off by setting the material to the aforementioned angle within the rather tight angular tolerance of plus or minus 1°. In contrast, the method of the present invention discloses the use of a relatively broad decoupled tilt angle range including α or Z axis tilt over which alignment may be achieved as part of an overall decoupled alignment procedure. For example, one specific angle which has been found to be useful for α in the present invention is 9°. Moreover, the problem of Poynting vector walk-off is not of concern with regard to the present invention due to certain, known design considerations recognized in the prior art and, in fact, described by the '597 patent. For example, in the laser of the present invention, the birefringent nonlinear crystal is only 3 mm long as contrasted with the 5 mm long KTP crystal in the '597 patent. In addition, the beam radius within the birefringent nonlinear crystal of the present invention is approximately 150 microns as contrasted with a 50 micron beam radius in the '597 patent. As a result of the shortened nonlinear element and enlarged beam radius, the laser of the present invention experiences insignificant amounts of walk-off for which no compensation is required.

It should be appreciated that the concepts of the present invention, as taught herein, may be applied in a number of different ways by one of ordinary skill in the art. Therefore, the present examples and method are considered as illustrative and not restrictive, and the invention is not to be limited to the details given herein, but may be modified within the scope of the appended claims.

What is claimed is:

1. In a laser having an alignable light path defined within a resonant cavity of the laser and including a birefringent nonlinear material having an input face, a method of performing alignment adjustments for bringing said laser into a desired alignment which, in turn, affects light output intensity of the laser, said method comprising the steps of:

a) orienting said birefringent nonlinear material in said light path in a way which causes said light path to pass through said input face such that said alignment adjustments affect a plurality of parameters which parameters are normally interdependently coupled to one another with respect to each alignment adjustment, one of said parameters being phase retardance of said birefringent nonlinear material and one of said adjustments being tilt angle of the birefringent non-linear material with respect to said light path;

b) substantially decoupling at least one adjustment from the phase retardance parameter by fabricating the birefringent nonlinear material so that a particular parameter of the birefringent material is substantially optimized for any angle within an optimized range of angles surrounding a specific angle measured from the light path to a line normal to said input face of the birefringent nonlinear material and, thereafter, setting the orientation of said birefringent nonlinear material such that said line normal to said input face resides in a particular range of angles which is centered on said specific angle;

c) adjusting the tilt angle in the orientation of the birefringent nonlinear material with respect to the light path such that said particular parameter remains substantially optimized so as to adjust parameters other than said phase retardance in a way that at least partially brings said laser into the desired alignment; and d) using an adjustment other than said tilt angle, adjusting said phase retardance to bring the laser into said desired alignment.

2. The method of claim 1 wherein said optimized range of angles extends to approximately three degrees in any direction from said specific angle.

3. The method of claim 1 wherein said particular parameter is a function of crystalline axis orientation of said birefringent nonlinear material.

4. The method of claim 3 wherein said particular parameter is phasematching performance which is optimized at said specific angle.

5. The method of claim 1 wherein said nonlinear birefringent material includes an X-Y crystalline axis plane and a Z axis which is perpendicular thereto and wherein said tilt angle is taken as a rotation of the X-Y crystalline axis plane about said Z axis.

6. The method of claim 5 wherein said birefringent material is KTP and wherein said particular range of angles extends from approximately 4° to 10° with respect to said light path for adjustment of the tilt angle by rotation about the Z-axis..

7. The method of claim 6 wherein said tilt angle is adjusted to approximately 9° in the X-Y plane with respect to said light path in step (d).

8. The method of claim 1 wherein said nonlinear birefringent material includes an X-Y crystalline axis plane and a Z axis which is perpendicular thereto and wherein said tilt angle is taken as tilting the Z axis directly toward/away from said light path in along either direction of the light path.

9. The method of claim 8 wherein said birefringent material is KTP and wherein said particular range of angles includes tilts from 0° to 3° towards or away from the light path when the Z-axis is oriented normal to the light path at 0°.

10. The method of claim 1 wherein, at said specific angle, the rate of change of phase retardance with said tilt angle of the birefringent material is equal to zero.

11. The method of claim 1 wherein said nonlinear material is KTP and includes three orthogonal crystalline axes which are defined as x, y and z, and wherein said x axis forms an angle with respect to said normal line of approximately 28.6°.

12. The method of claim 1 wherein said other parameter is phase matching.

13. The method of claim 1 wherein said phase retardance parameter is adjusted using a temperature adjustment.

* * * * *